United States Patent [19]

Kampman et al.

[11] 4,019,643
[45] Apr. 26, 1977

[54] HAY CARRYING APPARATUS

[75] Inventors: Lester R. Kampman; James H. Hodgson, both of Vinton, Iowa

[73] Assignee: Chromalloy American Corporation, New York, N.Y.

[22] Filed: July 22, 1975

[21] Appl. No.: 598,061

[52] U.S. Cl. .............................. 214/505; 214/508; 214/83.36; 280/463; 280/472
[51] Int. Cl.² ........................................ B60P 1/28
[58] Field of Search .......... 214/501, 505, 506, 508, 214/509, 83.36; 198/7 BL; 280/460 A, 462, 463, 472, 490 A

[56] References Cited

UNITED STATES PATENTS

| | | | |
|---|---|---|---|
| 3,209,932 | 10/1965 | Schiltz | 214/508 X |
| 3,366,257 | 1/1968 | Strom | 214/508 X |
| 3,800,966 | 4/1974 | Newton | 214/508 |
| 3,924,765 | 12/1975 | Hostetler | 198/7 BL |
| 3,951,288 | 4/1976 | Hale et al. | 214/519 X |

*Primary Examiner*—Albert J. Makay
*Attorney, Agent, or Firm*—Wegner, Stellman, McCord, Wiles & Wood

[57] ABSTRACT

A wheeled carrier for hay or the like has a low bed that may be tilted from a horizontal transport position rearwardly for rear loading or forwardly for front loading, and has a draft tongue secured by a transverse pivot adjacent a front corner of the bed and swingable laterally about an upright pivot so that the carrier may be towed directly behind a tractor for transporting a load or offset from the tractor for front loading. The bed consists of a set of short front parallel rails and a set of long rear parallel rails; and longitudinal chain conveyor means for both sets of rails has a single drive shaft that extends through overlapping inner end portions of both sets and may be driven in either direction. The extremities of the conveyor means are on idler sprockets with no continuous cross shafts.

23 Claims, 7 Drawing Figures

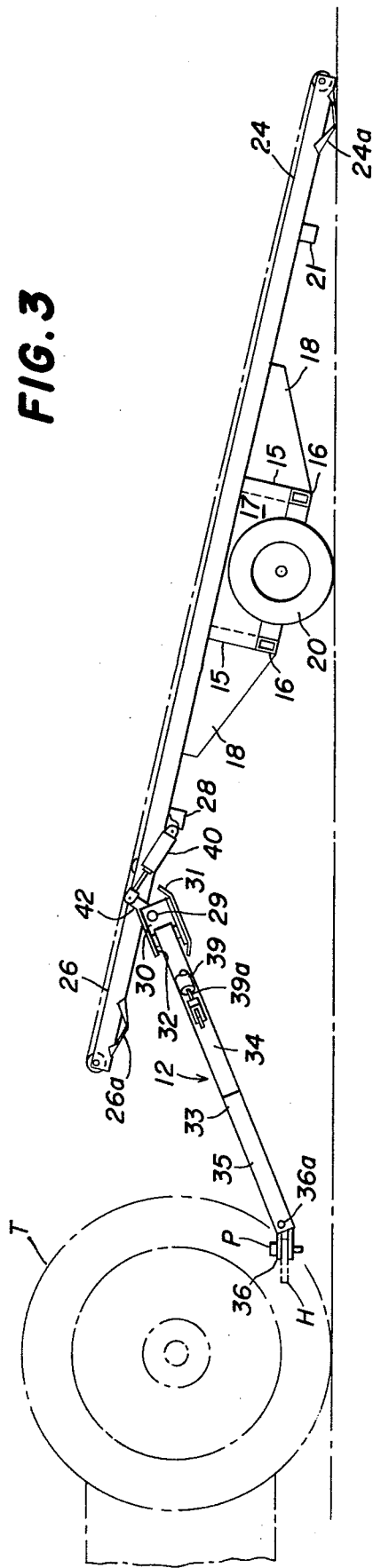
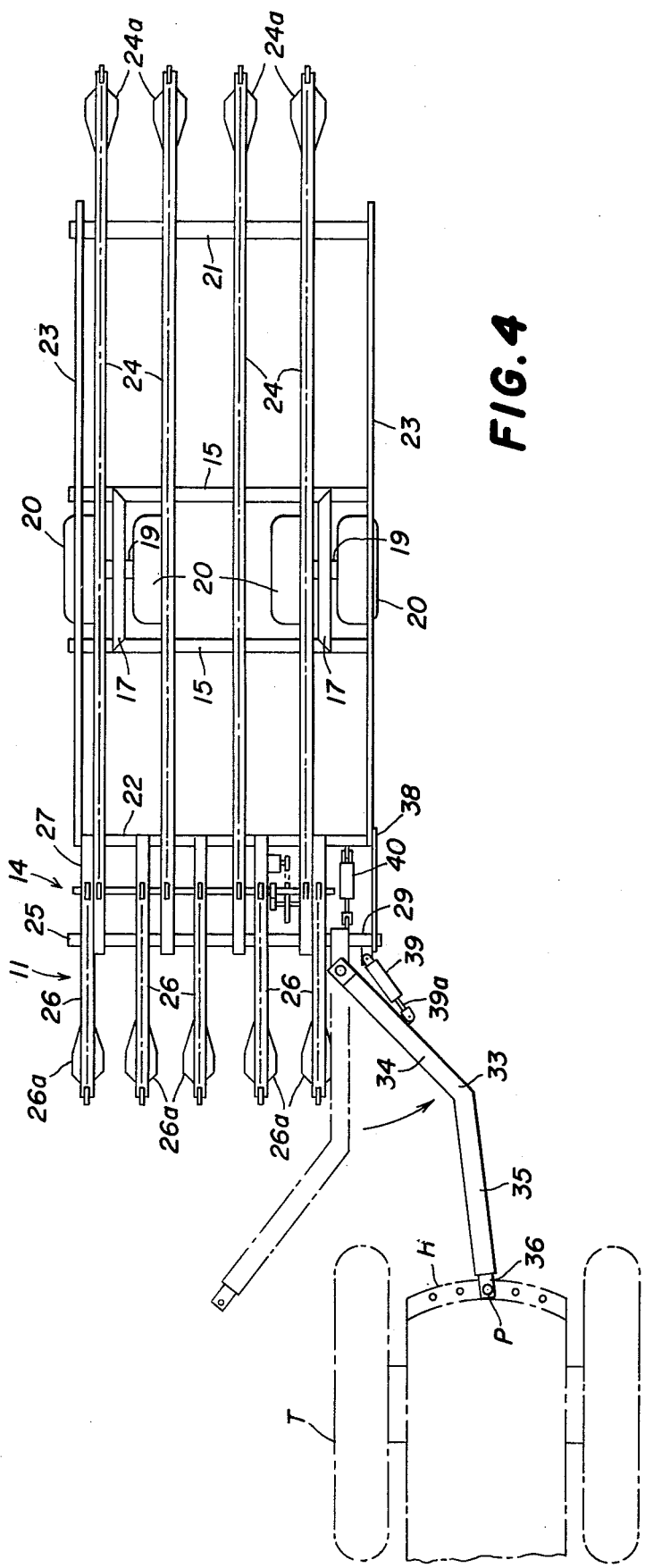
FIG.3
FIG.4

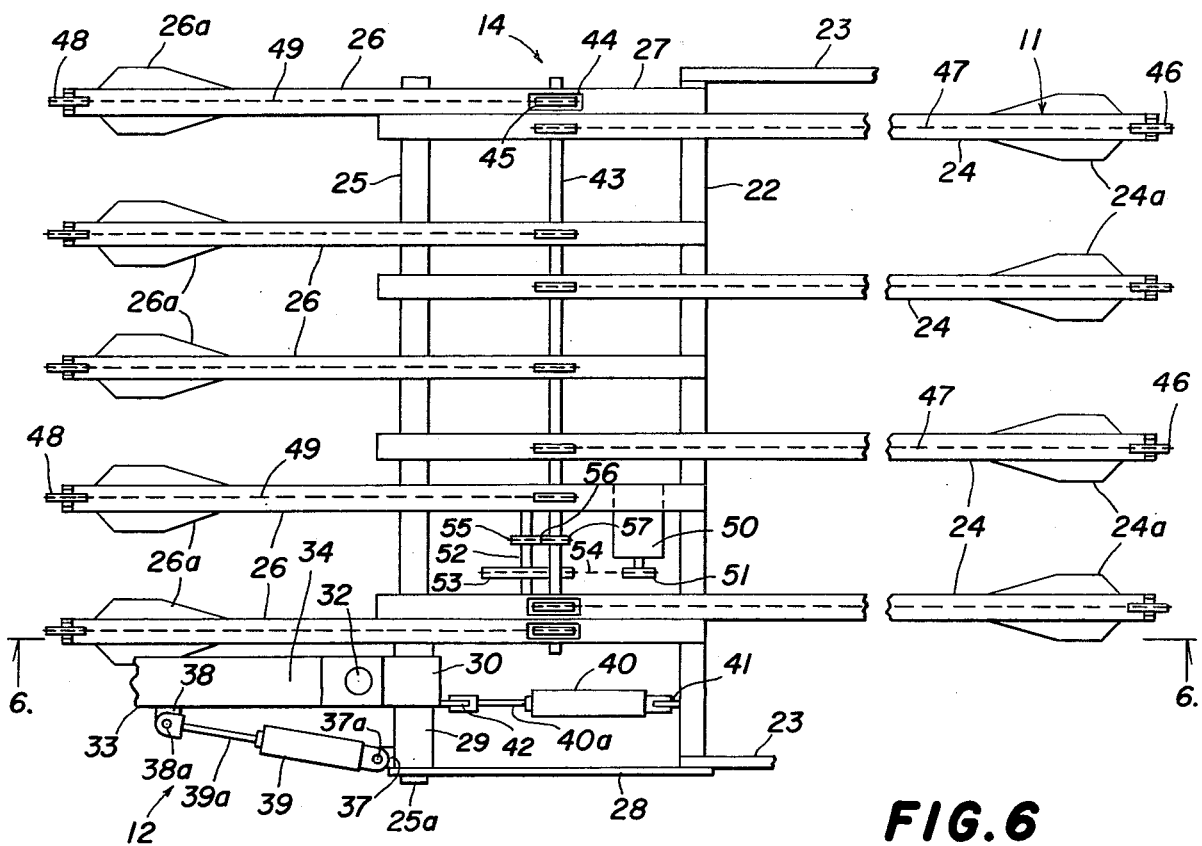
FIG. 5
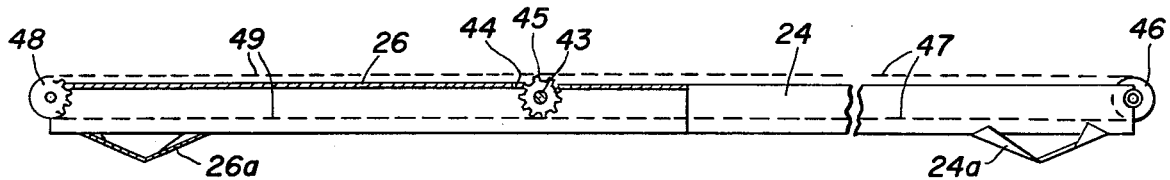
FIG. 6
FIG. 7
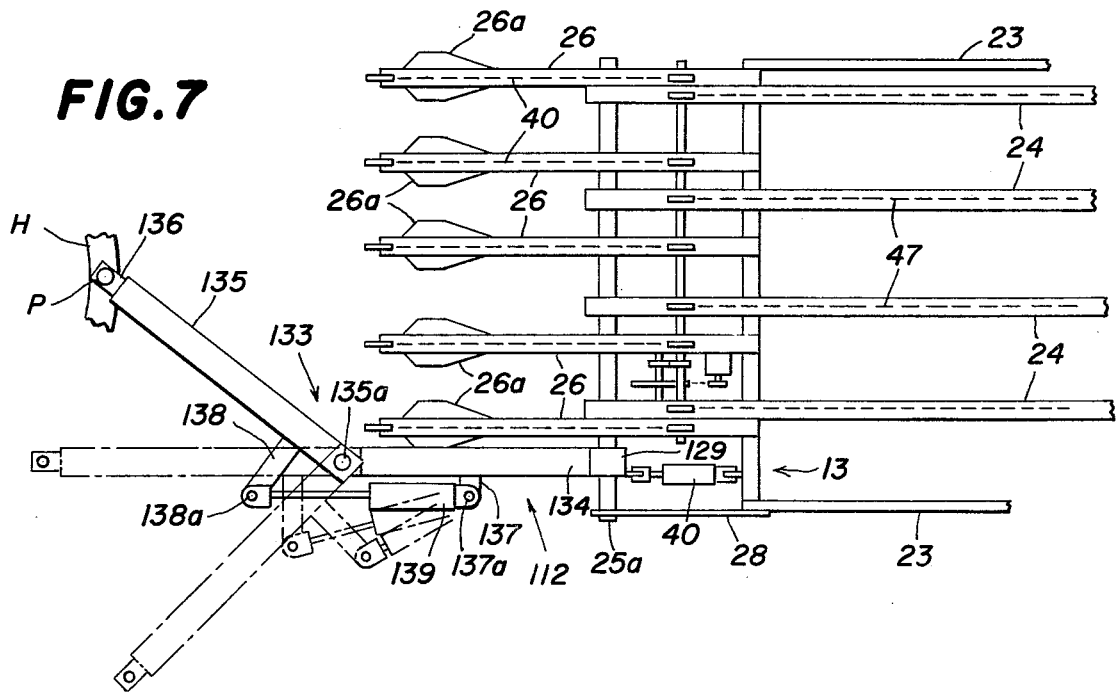

HAY CARRYING APPARATUS

BACKGROUND OF THE INVENTION

Modern farming methods employ such devices as bale rollers which roll a swath or windrow of hay or other long fiber forage crops into hugh rolls which are left in the field, or straw bunchers which take the straw from a combine and drop it in large bunches about a field. The prior art contains a number of specialized transport devices which have a normally horizontal bed that may be tilted rearwardly in order that a tractor may back the transport device under a large bale or under a bunch of straw, after which the bed is returned to its horizontal transport position so the hay or straw may be moved to a place of storage. Commonly, such transport devices are provided with conveyor chains that extend the whole length of the bed and that may be driven to push the load off the rear of the bed. In some cases, the chains carry a movable upright wall which bears against the front of the bale or bunch. In other cases they have upstanding hay engaging fingers at intervals along the chains so that by using a reversible drive the conveyors may assist in loading the transport device as well as in unloading it.

Typical of such prior art devices are those disclosed in U.S. Pat. Nos. 2,761,577; 3,366,257; 3,415,400; 3,209,932; and 3,624,786.

A difficulty with all such devices is that they may be loaded only by backing the tractor which requires considerable skill to drive the transport device directly beneath the load in a straight line and which also requires that the tractor operator guess when the entire load is on the transport device or else dismount from the tractor to go to the rear of the transport device.

SUMMARY OF THE INVENTION

The present invention provides a carrier for hay or the like which may be tilted either rearwardly for rear loading or forwardly for front loading, and which has its draft tongue secured adjacent a front corner of the carrier bed so that it may be swung laterally between a transport position in which the carrier is directly behind the tractor and a front loading position in which the carrier is completely offset to one side of the tractor. This permits the operator to swing the carrier to a position to one side of the line of travel of the tractor, tilt the carrier for forward loading, and drive the tractor forward alongside the bale or bunch where he can see exactly what is happening and can tell when the entire load is on the carrier.

In addition, the carrier of the invention has a unique bed structure that consists of forward and rearward sets of longitudinal rails which have their inner ends overlapping so that a single drive shaft may extend through the overlapping ends of both sets and carry the drive sprockets for chain conveyors which are mounted one on each rail of each set with only idler sprockets and no shafts at the ends of the rails. Eliminating the cross shafts at the ends of the rails makes it easier to push the rails beneath a bale or bunch of material during loading.

The principal object of the invention, therefore, is to provide an improved apparatus for picking up and transporting a mass of material such as hay or straw.

Another object of the invention is to provide such an apparatus which may be loaded and discharged either from the front or from the rear.

Still another object of the invention is to provide such an apparatus in which a chain conveyor system which is used to unload the apparatus and which may be used to assist in loading it has no shafts at the ends of the carrier bed.

THE DRAWINGS

FIG. 3 is a side elevational view of the apparatus in rearwardly tilted, rear loading position;

FIG. 4 is a plan view of the apparatus in its forwardly tilted, laterally displaced forward loading position and with the hitch tongue illustrated in broken lines in transport position;

Figure 1:
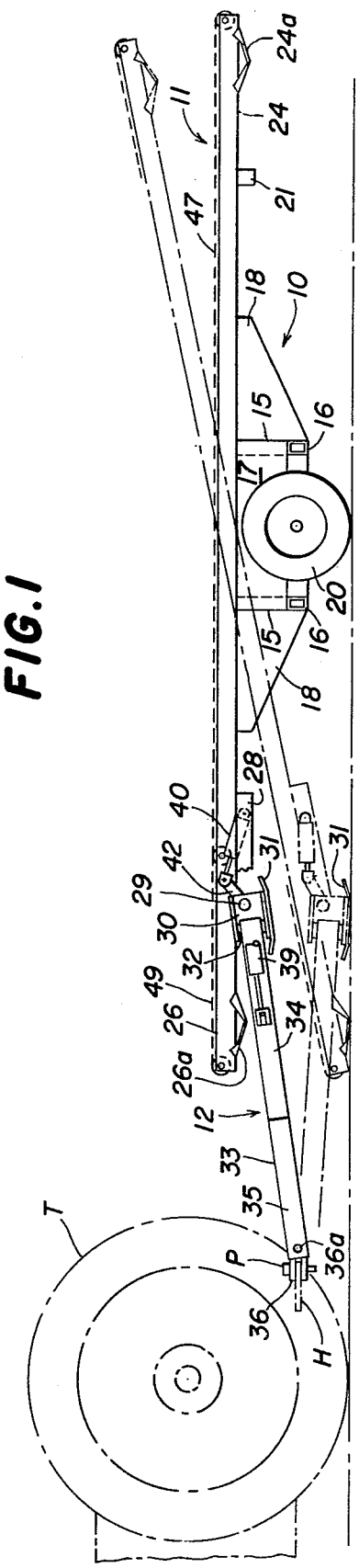
FIG. 1 is a side elevational view of a first embodiment of the apparatus of the invention illustrated in a transport position in full lines and in a forwardly tilted loading position in broken lines, with a tractor also illustrated in broken lines.

FIG. 5 is a fragmentary plan view on an enlarged scale to illustrate details of the actuating pistons and the drive for the conveyors and with the front and rear skids omitted for clarity; FIG. 6 is a sectional view taken substantially as indicated along the line 6—6 of FIG. 5; and FIG. 7 is a fragmentary plan view of a second embodiment of the apparatus which differs from the first in the structure of its draft tongue.

DETAILED DESCRIPTION OF THE INVENTION

Referring to the drawings, the apparatus of the invention consists of a mobile frame, indicated generally at 10, which is surmounted by a bed, indicated generally at 11. At a front corner of the apparatus is a draft tongue, indicated generally at 12; and associated with the draft tongue is a hydraulic bed tilting means, indicated generally at 13. Conveyor means associated with the bed 11 is indicated generally at 14.

The mobile frame consists of a pair of deep, transverse channel members 15 along the lower ends of which are transverse box beams 16, longitudinal webs 17 connect the channels 15, and fore-and-aft extending webs 18 project from the channels 15. Mounted in the webs 17 are axles 19 for dual wheels 20. A rear cross beam 21 and a front cross beam 22 are connected by longitudinal side bars 23.

Figure 2:
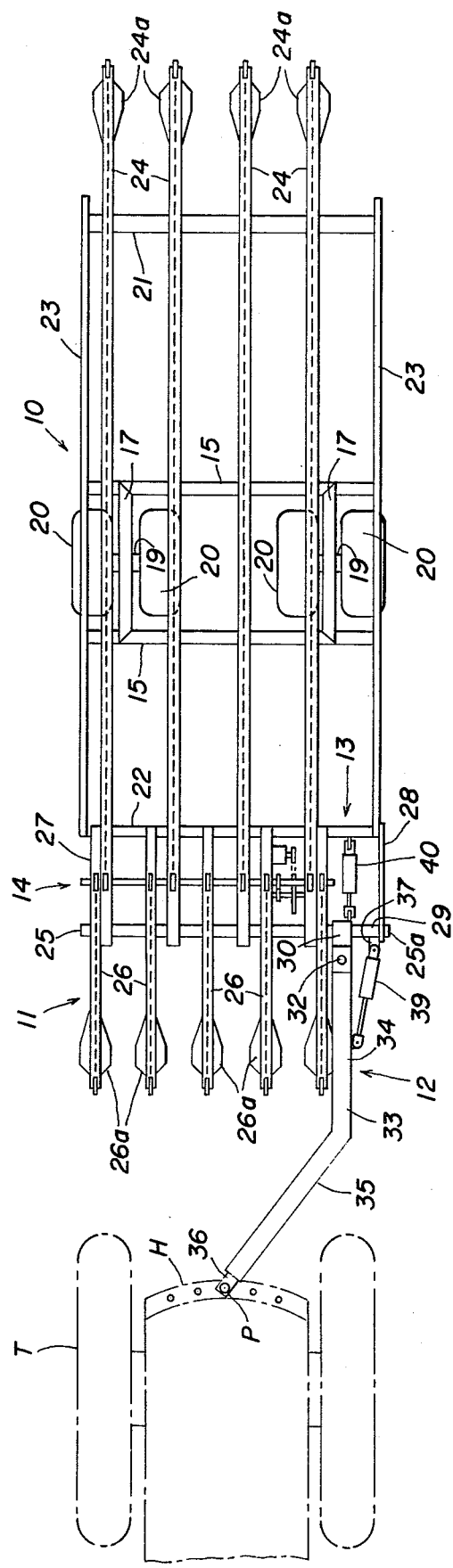
FIG. 2 is a plan view of the apparatus of the invention in transport position with a tractor illustrated in broken lines.

As seen in FIG. 2, the bed 11 consists of a set of parallel longitudinal rear rail 24 which are supported upon the cross webs 15 and the rear and front cross beams 21 and 22 and which have their forward ends supported upon a front cross member 25; and a set of parallel longitudinal front rails 26 which alternate with the rear rails 24 and are supported upon the cross members 22 and 25 between which the rear rails and the front rails have an overlapping area 27.

As best seen in FIG. 5, a shaft 25a extends laterally from the front cross member 25 and has its outboard end supported in a frame plate 28. The draft tongue assembly 12 includes a sleeve 29 which is rotatably mounted upon the shaft 25a and carries a yoke 30 which is thus rotatable about a transverse axis provided by the shaft 25a. As seen in FIG. 1, the underside of the yoke 30 is provided with a skid 31 which rests upon the ground when the apparatus is in its forwardly tilted front loading position. At the front of the yoke 30 is an upright pivot 32 which receives the rear end of a draft tongue 33 which is laterally swingable about the pivot 32 between a transport position which is illustrated in FIG. 2 and a laterally offset front loading position which is illustrated in FIG. 4. The draft tongue 33 has a rearward portion 34 which is parallel to the longitudinal rails 24 and 26 in transport position, and a forward portion 35 which extends diagonally inwardly so that a yoke 36 at its forward end is substantially on the longitudinal median line of the apparatus when the tongue is in transport position. The draft tongue yoke 36 is mounted at the forward extremity of the draft tongue 33 upon a transverse pivot 36a and may be connected to a hitch H of a tractor T by means of a pintle P in the conventional way.

Also secured to the sleeve 29 is a bracket 37, and on the rearward portion 34 of the hitch tongue is a laterally extending bracket 38; and mounted between the brackets 37 and 38 on upright pivots 37a and 38a is a hydraulic cylinder and piston unit 39 which is seen to have its piston rod 39a extended when the draft tongue 33 is in transport position. Retraction of the piston rod 39a swings the draft tongue 33 laterally to its front loading position as seen in FIG. 4.

The means for tilting the apparatus between its horizontal transport position and its front and rear loading positions constitutes a cylinder and piston unit 40 which has one end connected to a transverse pivot on a bracket 41 which is on the forward cross beam 22, and which has its other end connected to a transverse pivot on a rib 42 that is seen in FIG. 1 to extend upwardly and rearwardly from the yoke 30 so that the transverse pivot for the forward end of the cylinder and piston unit 40 is above the transverse pivot axis of the yoke.

In the transport position illustrated in solid lines in FIG. 1 the pistonrod 40a of the cylinder and piston unit 40 is in a partially extended position, and the apparatus is swung to the front loading, broken line position of FIG. 1 by retracting the piston rod. Extension of the piston rod 40a moves the apparatus to the rear loading position of FIG. 3.

It is obvious that the draft tongue 33 may be swung to its laterally displaced position for front loading only while the tractor and the apparatus are in motion. The cylinder and piston units 39 and 40 are connected to the tractor hydraulic system by a conventional set of pressure hoses (not shown), and the system includes valve means mounted on the tractor in a position to be conveniently manipulated by an operator sitting on the tractor seat. The valve means controls the retraction and extension of both cylinder and piston units.

Either front loading or rear loading of the apparatus requires that an end of the bed 11 be moved into contact with the ground as illustrated in FIGS. 1 and 3, and to prevent the ends of the rails from digging into the ground during loading, the underside of each of the rails 24 is provided with a skid 24a, and the underside of each of the rails 26 is provided with a skid 26a.

As best seen in FIG. 5, the conveyor system 14 includes a cross shaft 43 which is journalled in the overlapping portions 27 of the rails 24 and 26, and in the top of each rail above the shaft 43 is an opening 44 through which a sprocket 45 on the shaft projects. At the rear end of each of the rear rails 24 is an idler sprocket 46, and trained around each idler sprocket 46 and the aligned sprocket 45 is a conveyor chain 47. Similarly, at the front of each of the front rails 26 is a sprocket 48, and a chain 49 is trained around each of the sprockets 48 and the aligned sprockets 45.

Power for driving the conveyor means 14 is provided by a hydraulic motor 50 which is supported beneath one of the forward rails 26 and has an output sprocket 51. An intermediate shaft 52 has an input sprocket 53 which is driven from the motor sprocket 51 by a chain 54; and an output sprocket 55 on the shaft 52 is connected by a chain 56 with an input sprocket 57 on the conveyor shaft 43. The hydraulic motor 50 is reversible so that the conveyor chains 47 and 49 may be driven in either direction; and the motor is connected with the tractor hydraulic system through pressure conduit (not shown) and a three position control valve on the tractor which has an open center and a control handle which is moved one way or the other to put hydraulic pressure on one side or the other of the motor 50.

The second embodiment of FIG. 7 is the same as the first embodiment, except that it has a draft tongue means 112 which is different from the draft tongue means 12. Accordingly, only that portion of the apparatus of FIG. 7 is described in detail, and other components are given the same numbers that they bear in FIGS. 1 to 6.

The alternative draft tongue means of FIG. 7 includes a small sleeve 129 which is journalled upon a rod 25a; and a draft tongue 133 includes a rearward portion 134 which is integral with the sleeve 129 and extends forwardly parallel to the forward rails 26, and it also includes a forward portion 135 which is mounted on an upright pivot 135a at the front end of the fixed draft tongue portion 134. Projecting laterally from the fixed draft tongue portion 134 is a bracket 137, while projecting laterally from the swingable forward draft portion 135 is a bracket 138; and a cylinder and piston unit is mounted between upright pivots 137a and 138a on the respective brackets 137 and 138. As in the first embodiment of the apparatus, the cylinder and piston unit 139 is connected to the tractor hydraulic system and is controlled by means of a valve which is manipulated by an operator on the tractor seat.

The reversible conveyor system 14 of the apparatus is significant to the operation of the unit for two reasons. First, placing the conveyor drive shaft 43 at the overlapping inner end portions 27 of the rails 24 and 26 permits the idler sprockets 46 and 48 at the extremities of the rails to be journalled without the need for a continuous cross shaft as has previously been used in apparatus of the present general type. A cross shaft at the end of the rails interferes with loading, and the prior art devices have used various expedients in an effort to minimize the interference with loading which is caused by the cross shaft at the end of the rails.

In addition, the conveyor means 14 may be used to assist in loading either from the front or from the rear, and may also be used in unloading either to the rear or to the front. However, in most instances the apparatus is unloaded to the rear.

Furthermore, the present structure, and in particular the conveyor system without cross shafts at their ends, permits a bale or other mass of hay to be loaded without rotation of the mass, so that cylindrical bale may be loaded with the bale moved onto the apparatus either endwise or sidewise.

The foregoing detailed description is given for clearness of understanding only and no unnecessary limitations should be understood therefrom as modifications will be obvious to those skilled in the art.

We claim:

1. Apparatus for picking up and transporting a mass of material, said apparatus comprising, in combination:

a chassis having supporting wheels;

an elongated load carrying bed having a front end and a rear end, said bed being mounted on the chassis for tilting movement about a transverse axis which is in the vicinity of said wheels and of the transverse median plane of the bed;

a draft tongue the forward end of which is attachable to a tractor;

means connecting said draft tongue to the bed adjacent a front corner thereof, said means being constructed and arranged so that at least the forward portion of the draft tongue is swingable with respect to the bed in a generally vertical plane and in a generally horizontal plane;

first power driven means operatively connected to the bed for tilting it between a substantially horizontal transport position, a front loading position with its front end on a supporting surface, and a rear loading position with its rear end on a supporting surface;

second power driven means for turning the swingable portion of the draft tongue in a generally horizontal plane between a transport position in which the forward end of the tongue is substantially on a projection of the longitudinal median plane of the bed and a front loading position in which said forward end of the tongue is offset laterally outwardly from the longitudinal plane of the adjacent side of the bed;

longitudinally movable means on the bed which is adapted to engage a mass of material and move it toward and end of the bed;

and reversible rotary hydraulic motor means for driving said movable means toward either end of the bed.

2. The combination of claim 1 in which the draft tongue connecting means includes a bracket mounted on a transverse bracket pivot adjacent the front corner of the bed, and an upright tongue pivot on said bracket.

3. The combintion of claim 2 in which the first power driven means comprises a first hydraulic cylinder and piston unit which has a first end connected to the bracket by a transverse first pin which is offset vertically from the plane of the bracket pivot and which has a second end connected to a transverse second pin which is on the bed behind the bracket.

4. The combination of claim 3 in which the first pin is above the bracket pivot.

5. The combination of claim 3 in which the second power driven means comprises a second hydraulic cylinder and piston unit which has a first end connected to an upright first pintle that is fixed with reference to the bracket, and which has a second end connected to an upright second pintle that is on the tongue ahead of the tongue pivot.

6. The combination of claim 5 in which the draft tongue has a rearward portion which is fixedly connected to the bracket, the tongue pivot is adjacent the forward extremity of said rearward portion of the tongue, and the first pintle is on said rearward portion.

7. The combination of claim 5 in which the bracket comrpises a yoke with vertically spaced flanges, the tongue pivot is between said flanges, the tongue has a rearward portion mounted on the tongue pivot and a forward portion which is at an obtuse angle to said rearward portion so that the rearward portion extends generally longitudinally of the bed when the tongue is in transport position, and in which the first pintle is on the yoke and the second pintle is on said rearward portion.

8. The combination of claim 2 in which the second power driven means comprises a second hydraulic cylinder and piston unit which has a first end connected to an upright first pintle that is fixed with reference to the bracket, and which has a second end connected to an upright second pintle that is on the tongue ahead of the tongue pivot.

9. The combination of claim 8 in which the draft tongue has a rearward portion which is fixedly connected to the bracket, the tongue pivot is adjacent the forward extremity of said rearward portion of the tongue, and the first pintle is on said rearward portion.

10. The combination of claim 8 in which the bracket comprises a yoke with vertically spaced flanges, the tongue pivot is between said flanges, the tongue has a rearward portion mounted on the tongue pivot and a forward portion which is at an obtuse angle to said rearward portion so that the rearward portion extends generally longitudinally of the bed when the tongue is in transport position, and in which the first pintle is on the yoke and the second pintle is on said rearward portion.

11. The combination of claim 1 in which the first hydraulic motor means comprises a longitudinally oriented first cylinder and piston unit which has a forward end operatively connected to the rear portion of the tongue through a transverse first pin and which has a rear end connected to the bed through a transverse second pin.

12. The combination of claim 11 in which the second hydraulic motor means comprises a second cylinder and piston unit which has a first end operatively connected to the bed through an upright first pintle and which has a second end connected to the swingable portion of the tongue through an upright second pintle.

13. The combination of claim 1 in which the bed comprises a set of longitudinal rail means, and which includes endless conveyor means comprising a transverse drive shaft which is intermediate the ends of the rail means and has a drive sprocket for each rail means, an idler sprocket on a stub shaft on the outer end portion of each of the rail means, endless conveyor means for each rail means in driving engagement with a drive sprocket and trained over an idler sprocket, and a reversible hydraulic motor operatively connected to the drive shaft.

14. The combination of claim 13 in which the rail means comprises a forward set of longitudinal rails, and a rearward set of longitudinal rails each of which is laterally offset from the rails of the forward set, said rails all having overlapping inner end portions, the drive shaft extends through said overlapping inner end portions and has a drive sprocket for each rail of both sets, there is an idler sprocket on a stub shaft on the outer end portion of each rail of both sets and the endless conveyor chain means includes a chain for each rail trained over a drive sprocket and over an idler sprocket.

15. The combination of claim 14 in which the forward and rearward sets of rails overlap for only a short distance, and said overlap is close to the front of the bed.

16. Apparatus for picking up and transporting a mass of material, said apparatus comprising, in combination:

a chassis having a pair of supporting wheels;

an elongated load carrying bed having a front end and a rear end, said bed being mounted on the chassis for tilting movement about a transverse axis which is in the vicinity of said wheels and of the transverse median plane of the bed, said bed comprising a forward set of longitudinal rails, and a rearward set of longitudinal rails each of which is laterally offset from the rails of the forward set, said rails all having overlapping inner end portions;

endless conveyor means comprising a transverse drive shaft which extends through said overlapping inner end portions and has a drive sprocket for each rail of both sets, an idler sprocket on a stub shaft on the outer end portion of each rail of both sets, a conveyor chain for each rail in driving engagement with a drive sprocket and trained over an idler sprocket, and a hydraulic drive motor operatively connected to the drive shaft;

power driven means operatively connected to the bed for tilting the bed between a substantially horizontal transport position and a rear loading position with its rear end on a supporting surface;

and a draft tongue which has a rearward end pivotally connected to the front of the bed on a transverse pivot and a forward end attachable to a tractor.

17. The combination of claim 16 in which the forward and rearward sets of rails overlap for only a short distance, and said overlap is close to the front of the bed.

18. The combination of the claim 16 in which the hydraulic drive motor is reversible, the power driven means has an intermediate position in which the bed is in trasport position, a first limit position for rear loading, and a second limit position in which the front end of the bed is on a supporting surface for front loading, in which the transverse pivot for the draft tongue is mounted on a bracket adjacent a front corner of the bed, in which the draft tongue has at least a forward portion that is laterally swingable about an upright tongue pivot forward of the transverse pivot, and in which second power driven means is provided for turning the swingable portion of the draft tongue in a generally horizontal plane between a transport position in which the forward end of the tongue is substantially on a projection of the longitudinal median plane of the bed and a front loading position in which said forward end of the tongue is offset laterally outwardly from the longitudinal plane of the adjacent side of the bed.

19. The combination of claim 18 in which the second power driven means comprises a second hydraulic cylinder and piston unit which has a first end connected to an upright first pintle that is fixed with reference to the bracket, and which has a second end connected to an upright second pintle that is on the tongue ahead of the tongue pivot.

20. The combination of claim 19 in which the draft tongue has a rearward portion which is fixedly connected to the bracket, the tongue pivot is adjacent the forward extremity of said rearward portion of the tongue, and the first pintle is on said rearward portion.

21. The combination of claim 19 in which the bracket comprises a yoke with vertically spaced flanges, the tongue pivot is between said flanges, the tongue has a rearward portion mounted on the tongue pivot and a forward portion which is at an obtuse angle to said rearward portion so that the rearward portion extends generally longitudinally of the bed when the tongue is in transport position, and in which the first pintle is on the yoke and the second pintle is on said rearward portion.

22. Apparatus for picking up and transporting a mass of material, said apparatus comprising, in combination:

a chassis having supporting wheels;

an elongated load carrying bed having a front end and a rear end, said bed comprising a set of parallel, longitudinal rail means with coplanar upper surfaces, said rail means being mounted on the chassis for tilting movement about a transverse axis which is in the vicinity of the transverse median plane of the bed, and said rail means having front and rear ends which are free of any transverse connecting members;

endless conveyor means comprising a single transversely extending drive shaft which extends through all said rail means a substantial distance from both the front and the rear ends thereof, a front idler sprocket journalled at the front end of each rail means, a rear idler sprocket journalled at the rear end of each rail means, a first intermediate drive sprocket keyed to said drive shaft and aligned with each front idler sprocket, a second intermediate drive sprocket keyed to said drive shaft and aligned with each rear idler sprocket, a front conveyor chain trained over each front idler sprocket and the aligned first intermediate drive sprocket, and a rear conveyor chain trained over each rear idler sprocket and the aligned second intermediate drive sprocket, each of said conveyor chains having an upper run above the upper surfaces of the rail means;

a single reversible drive motor mounted beneath the load carrying bed;

means operatively connecting said drive motor to said drive shaft to drive all of said chains simultaneously either toward the front or toward the rear;

and power driven means operatively connected to the bed for tilting it between a substantially horizontal transport position, a front loading position with its front end on a supporting surface, and a rear loading position with its rear end on a supporting surface, werey the apparatus may be loaded selectively either from the front or from the rear and may be unloaded selectively either to the front or to the rear.

23. The combination of claim 22 in which each rail means comprises a forward rail and a rearward rail which are laterally offset from one another and have overlapping inner end portions, and the drive shaft extends through said overlapping inner end portions.

* * * * *